United States Patent
D'Agraives et al.

(10) Patent No.: US 6,741,360 B2
(45) Date of Patent: May 25, 2004

(54) METHOD FOR IDENTIFYING AN OBJECT

(75) Inventors: Bertrand Causse D'Agraives, Laveno (IT); Michel Chiaramello, Laveno (IT)

(73) Assignee: European Community, Brussels (BE)

( * ) Notice: Subject to any disclaimer, the term of this patent is extended or adjusted under 35 U.S.C. 154(b) by 0 days.

(21) Appl. No.: 10/258,233

(22) PCT Filed: May 7, 2001

(86) PCT No.: PCT/EP01/05147

§ 371 (c)(1),
(2), (4) Date: Mar. 28, 2003

(87) PCT Pub. No.: WO01/86589

PCT Pub. Date: Nov. 15, 2001

(65) Prior Publication Data

US 2003/0156294 A1 Aug. 21, 2003

(30) Foreign Application Priority Data

May 8, 2000 (LU) .................................................. 90580

(51) Int. Cl.⁷ .................................................. G01B 9/02
(52) U.S. Cl. ....................................... 356/512; 356/450
(58) Field of Search ............................... 356/450, 512, 356/511, 521, 496

(56) References Cited

FOREIGN PATENT DOCUMENTS

| DE | 44 08 226 | 9/1995 |
|----|-----------|--------|
| EP | 0 768 511 | 4/1997 |
| GB | 2 221 870 | 2/1990 |

*Primary Examiner*—Frank G. Font
*Assistant Examiner*—Andrew H. Lee
(74) *Attorney, Agent, or Firm*—Nath & Associates PLLC; Gary M. Nath; Jerald L. Meyer

(57) ABSTRACT

The invention concerns a method for identifying an object comprising the following steps: (a) selecting an intrinsic surface of an object to be identified; (b) illuminating at least an identification zone in the intrinsic surface of the object to be identified with a coherent light and intercepting at least part of the light reflected by the identification zone, so as to obtain an interference figure in specific illuminating and intercepting conditions; (c) preserving said interference figure as reference interference figure of the object to be identified; (d) placing a candidate object which could possibly be the object to be identified in similar illuminating and intercepting conditions as those used to obtain the reference interference figure and obtain from said candidate object an interference figure; (e) comparing the reference interference figure with the interference figure of the candidate object; and (f) assessing the probability of identity between the object to be identified and the candidate object based on the degree of correspondence between the reference interference figure and the interference figure of the candidate object.

12 Claims, 2 Drawing Sheets

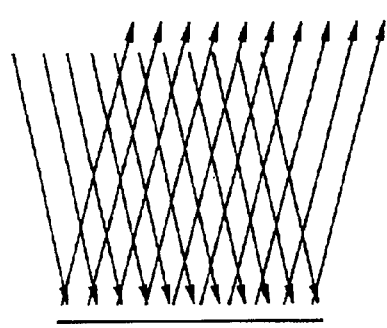
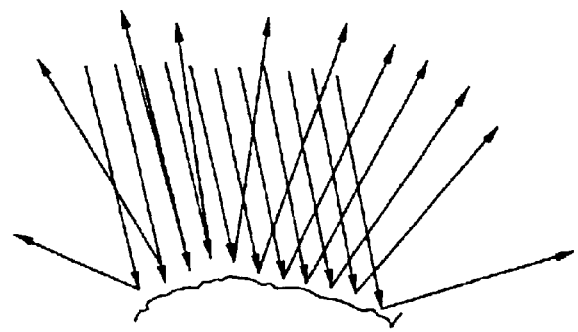
Fig. 1   Fig. 2
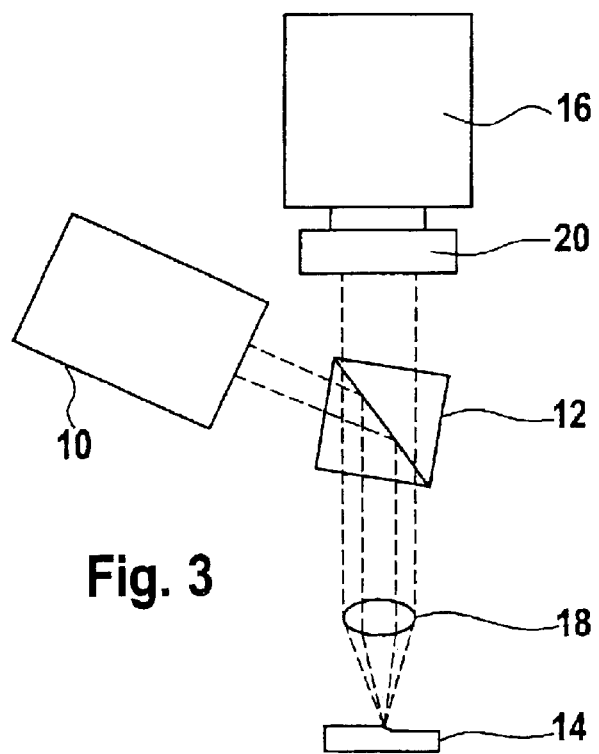
Fig. 3

METHOD FOR IDENTIFYING AN OBJECT

INTRODUCTION

The present invention relates to a method for identifying an object.

STATE OF THE ART

In order to identify each of the objects of a series of objects with identical appearance, the most standard method consists of fixing an identification plate on each object, each of the identification plates bearing a distinctive mark. However, if the identification plates are exchanged between several objects of the series, it is no longer possible to identify a particular object of the series with certainty.

GB-A-2,221,870 relates to a security device for use in an optical method based on the speckle interferometry phenomenon, better known as the "speckle effect". The security device comprises a substrate whereon or wherein there is a structure scattering the radiations. This radiation-scattering structure when it is illuminated by a coherent ray of radiations, causes random scattering; the scattered rays then interfering to generate an interference pattern. It should be noted that the radiation-scattering structure is formed by stamping with a die bearing a relief pattern. More specifically, a resin layer is stamped by means of said die so as to form the relief pattern therein, which is then covered with an aluminium reflecting layer. The radiation-scattering structure thereby formed, is then mounted on a support, thereby forming a security device, which in turn is irremovably mounted on an object for which a guarantee of authenticity is desired. The use of the stamping die has the advantage of allowing identical security devices to be manufactured, which will be fixed to objects of identical appearance in order to guarantee their authenticity.

Authentication of an object is performed by checking the security device which is associated with it. The interference pattern of the tested device is compared with the reference interference pattern, obtained under the same irradiation conditions, and the authenticity of the object is confirmed when the interference pattern of the tested device and the reference pattern are identical.

Such a security device provides relatively high security, as it is not conceivable that a potential counterfeiter may make a copy of the radiation-scattering structure capable of generating an interference pattern identical with the reference pattern. However, considering the high sensitivity of the involved physical phenomenon, the possibility of manufacturing by means of the die, a series of identical security devices which generate interference patterns identical with the reference interference pattern, is questionable. Further, if a counterfeiter would lay hold of the die, he would then be able to readily reproduce the radiation-scattering structure, and therefore also the security device.

Moreover, it should be noted that the security device, which forms an unforgeable identification plate, does not allow a particular object to be identified from a series of objects with an identical appearance. For this, a different security device must be made for each object of the series. However, the aforementioned problem would always remain, i.e. if the security devices were exchanged, it would no longer be possible to identify one object of the series, individually.

Finally, the requirement of fixing an identification plate to the object to be identified or authenticated, may prove to be a problem.

Indeed, it may not be possible to fix the identification plate in a sufficiently secure way. Furthermore, depending on how the object is used, the identification plate may be damaged.

OBJECT OF THE INVENTION (PROBLEM TO BE SOLVED BY THE INVENTION)

The object of the present invention is to provide a method for identifying an object which does not have the drawbacks of the method using identification plates, and which notably enables an object of a series of objects with identical appearance, to be identified individually. According to the invention, this object is achieved by a method according to claim 1.

General Description of the Claimed Invention with its Main Advantages

A method for identifying an object according to the invention comprises the following steps:

(a) selecting an intrinsic surface of an object to be recognized;

(b) illuminating at least one identification area in the intrinsic surface of the object to be recognized with coherent light and intercepting at least one portion of the light reflected by the identification area, in order to obtain an interference pattern under determined illumination and interception conditions;

(c) retaining this interference pattern as a reference interference pattern for the object to be recognized;

(d) placing a candidate object liable to be the object to be recognized under the same illumination and interception conditions as those used for obtaining the reference interference pattern and obtaining an interference pattern from this candidate object;

(e) comparing the reference interference pattern with the interference pattern of the candidate object; and (f) evaluating the probability of identity between the object to be recognized and the candidate object according to the matching level between the reference interference pattern and the candidate object's interference pattern.

By "intrinsic surface" of the object to be recognized, it is meant a surface specific to the object, which is an integral part of it, as opposed to a surface which would belong to a device fixed on the object for an identification purpose.

The method according to the invention uses an optical interference phenomenon, known as "speckle interferometry", for identifying an object.

When an object, which is not an ideal specular reflector is illuminated by a coherent light, microscopic variations on its surface shift the phase of the reflected and scattered light. If this light is intercepted, for example on a screen, an interference pattern may be observed, or a "speckle" pattern, produced by interferences between the phase-shifted components of this light. In the method according to the invention, an interference pattern obtained under determined illumination and interception conditions is considered as a unique imprint of the surface of the scanned object. Indeed, considering the complexity of the phenomenon involved, sensitive to surface variations on a micron scale, only the same object replaced under the same determined conditions will be able to produce a substantially identical interference pattern. Thus, in accordance with the method according to the invention, the interference pattern of an object to be recognized is retained as a reference interference pattern, a unique imprint allowing its identification. When it is subsequently desired to identify this object to be recognized, from a plurality of candidate objects liable to be the object to be recognized, it is sufficient to place each candidate object under the same illumination and interception conditions as those used for obtaining the reference interference pattern and obtain the interference pattern therefrom. A high matching level between an interference pattern obtained for a candidate object and the reference interference pattern will allow the identity of both objects to be confirmed with a high likelihood, i.e. the candidate object is actually the object to be recognized. A first advantage of the present method is its sensitivity, which makes it tamperproof. Indeed, the method is sensitive to surface variations on the micron scale, whereby it is therefore difficult to imagine a replacement of the object to be recognized, with a copy.

A second advantage of the method according to the invention, is that it does not require any labeling, any treatment, of the object to be recognized. Indeed, the natural surface state of the object to be recognized is preferably used. This means using the actual surface of the object which is therefore an integral part of the latter, and which has not undergone any specific treatment for standardizing the interference pattern which it is susceptible to produce. From the method according to the invention, it is sufficient to select a portion of the intrinsic surface of the object, i.e. the identification area, in order to obtain the interference pattern from it, and to store this interference pattern as a reference pattern, a unique imprint of the object, allowing its identification subsequently. The identification of the object may then be performed by obtaining an interference pattern of the same identification area, under the same irradiation conditions and by comparing it with the stored reference pattern. Generally, the surface of the identification area would be a surface machined by a machine tool, subsequently to the shaping of the object, for example. But the resulting surface profile resulting from such shaping is random. Therefore, the surface of the object at the identification area level, has a random non standardized profile. Consequently, this identification area is radically different from an identification area which would have undergone a specific treatment, for example die-stamping for standardizing the interference pattern liable to be produced by this identification area. As a result, it is impossible for a potential counterfeiter to reproduce the surface of the identification area by appropriating a specific treatment technique, as none exist.

In addition, it will be noted that in the present identification method, it is unnecessary to attach an identification device to the object for its subsequent identification, this simplifies implementation of the method. In particular, this eliminates any attachment or deterioration problem of the identification device.

The method according to the invention, therefore provides a secure and unforgeable identification of an object, and in particular enables an object to be identified individually from a series of objects with identical appearance.

Another advantage is that the identification of the object is performed without any direct contact, which prevents any wear of the identification area and of the surface reading means, which is a light beam here.

Preferably, the coherent light source is a laser beam focused on the identification area. Conventional laser sources may be used, for example of the HeNe type, or a laser diode, the latter providing more flexibility in its use.

Advantageously, the identification area will have a surface from 0.001 to 0.1 mm$^2$, preferably of the order of magnitude of 0.01 m$^2$.

Preferably, the identification area has a peak-to-peak roughness larger than the quarter of the laser's wavelength. The identification area may notably have a peak-to-peak roughness of 0.15 to 0.20 $\mu$m, which is the case for most unpolished metal surfaces. Lasers which radiate in the red, may thus be used.

Interception of the reflected light by the identification area may simply be performed by a screen. However, the reflected light will preferably be intercepted with a camera or a charge coupled device, which allows the interference patterns to be directly acquired onto computer means. The reference interference pattern may therefore be retained on a computer medium. Moreover, the matching level between the reference interference pattern and the interference pattern of a candidate object, is advantageously determined by image processing computer means which provides more objectivity.

Preferably, the computer means used enable the interference patterns to be stored and compared, comprising an indication of the intensity of the reflected light, for example by means of gray levels. Indeed, an interference pattern comprising indications of the intensity of the reflected light is more significative than for example a binarized (black and white) image. Such an interference pattern with its gray levels is therefore richer in information on the examined identification area. The number of interference spots required for the identification may therefore be smaller and consequently the dimension of the identification area may be reduced. This also means, that by using interference patterns for example with gray levels, a smaller amount of scattering centers is sufficient, as compared with binarized interference patterns.

Such a method for identifying objects, may advantageously be developed in order to operate in access control systems, i.e., systems providing the triggering of an action equivalent to an authorization after checking the identity of an object introduced into this system. However, it may also be used for identifying sensitive objects such as nuclear fuel cells. Within this context, it has the advantage of being able to be implemented under water.

DESCRIPTION WITH THE HELP OF THE FIGURES

Other features and characteristics of the invention will become apparent from the detailed description of an advantageous embodiment discussed below, by way of illustration, with reference to the appended drawings wherein:

FIG. 1 is a diagram illustrating reflection of light on a polished surface;

FIG. 2 is a diagram illustrating reflection of light on a rough surface;

FIG. 3 is a diagram of an assembly for implementing a preferred embodiment of the method according to the invention;

Figure 4:
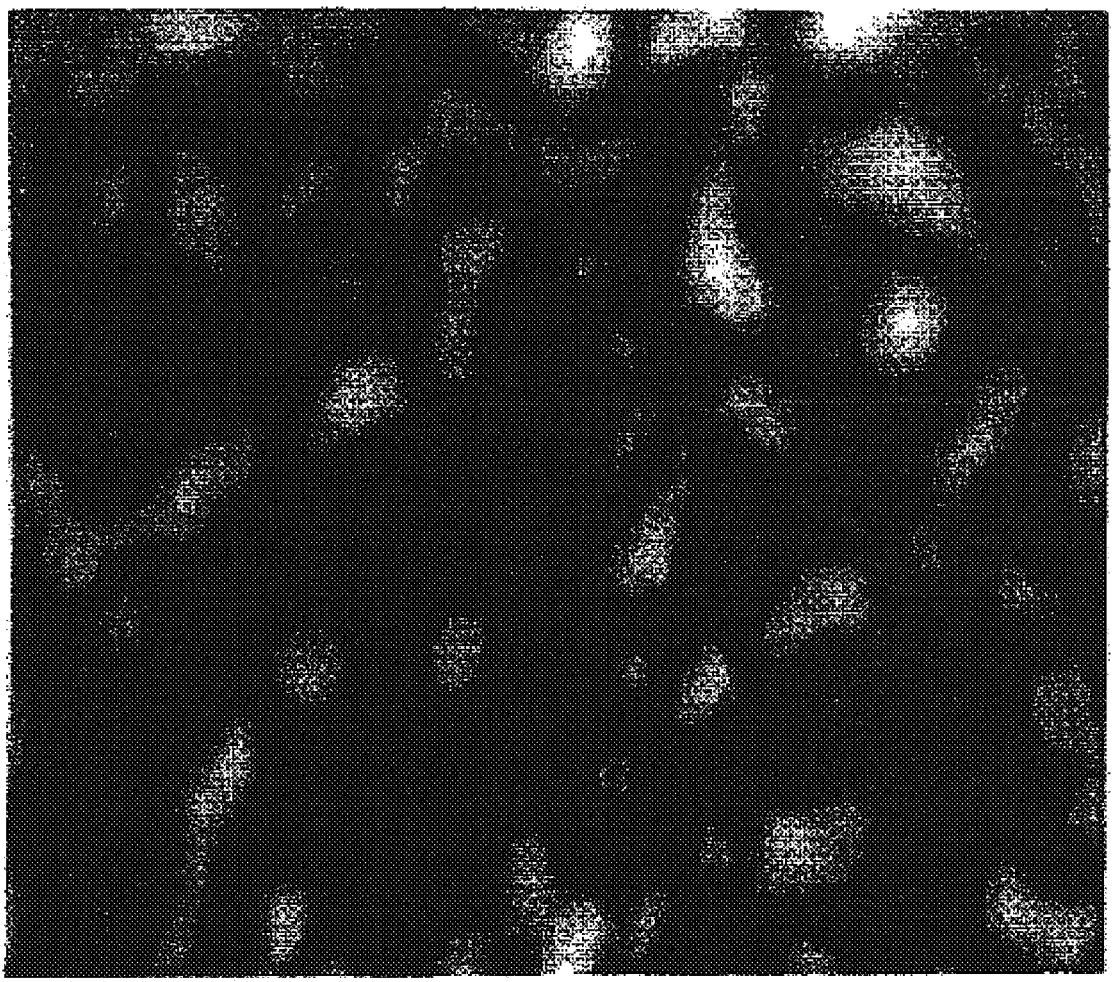
FIG. 4 is a speckle pattern.

The method according to the invention uses an optical interference phenomenon known as speckle interferometry, for identifying objects. When a surface is illuminated by an optical beam, all the elementary points of this surface reflect the incident light. In the case of a mirror type surface, these points all reflect in the same direction as illustrated in FIG. 1. In the case of a rough surface, which generally is the case, the elementary points reflect in all spatial directions, this is called scattering. If the incident beam is coherent, the surface reflects and scatters in all spatial directions, elementary beams which may interfere. By intercepting the elementary beams reflected on the screen, for example, an interference pattern or speckle pattern is obtained, consisting of more or less bright spots as shown in FIG. 4. Such an interference pattern is sensitive to surface changes on the micron scale.

Thus, according to an important aspect of the invention, it is considered that an interference pattern produced by a given surface portion, under determined illumination and interception conditions is unique. Another surface portion from the same object or from a different object under the same conditions will provide a different interference pattern. Such an interference pattern, therefore forms a unique imprint of a surface and may be used for identifying an object.

The method for identifying objects according to the invention was developed on the basis of this observation. An illustration of an assembly for implementing a preferred embodiment of this method, is illustrated in FIG. 3. Reference 10 shows a laser source which is a laser diode Lepton II (Micro Laser System) providing the emission of a monochromatic coherent light beam with a diameter of 6 mm and with insignificant divergence. The light beam emerging from the laser diode is reflected on a separator 12 towards a target object 14. As explained, the incident light beam is reflected and scattered by the surface of the target object 14. A camera 16 enables a portion of the light reflected by the surface of the target object 14 to be intercepted in order to obtain an interference pattern. A "planar-convex" type lens 18 mounted between the target object 14 and the separator 12, focuses the incident beam on the surface of the target 14 and acts as a diaphragm for collecting the beam reflected by the surface of the target object 14. With a filter 20, placed in front of the camera 16 and only letting through the light with the same wavelength as the laser 10, it is possible to ignore the ambient light conditions. The separator 12 performs the separation of the light sent back by the target object from the incident beam. Its orientation is such that parasitic reflections do not form on the sensor of the camera 16. It will be noted that a compact assembly may be obtained by using the separator 12, as the incident and reflected beams follow the same optical path between the separator 12 and the target object 14. By using a camera 16 connected to a computer, it is possible to proceed with direct acquisition of the interference patterns and to retain them as computer files. Further, the analysis of the interference pattern may be performed more objectively by means of data processing software packages. Preferably, the images of the stored interference patterns comprise an indication of the intensity of the reflected light, materialized by gray levels.

In a first step (step 1) of the method according to the invention, the target object 14 of FIG. 3 is an object to be recognized. The object to be recognized is positioned in a determined location, as defined for example by positioning blocks. One then proceeds with the acquisition of an interference pattern of an intrinsic surface portion of the object to be recognized, called the identification area, under determined conditions for the illumination and interception of reflected light, which are stored. An "intrinsic surface" means a surface specific to the object which is an integral part of it. The interference pattern is then retained (step 2) in the computer as a reference interference pattern of the object to be recognized. It should be noted that the surface of the identification area has not undergone any specific treatment, but that it has its natural (or rough) surface condition, and it therefore has a random surface profile, generally resulting from the machining of the object.

With the present method, this object to be recognized may subsequently be identified among other objects. Thus, according to step 3, a candidate object likely to be the object to be recognized is placed in the same position, while providing the same illumination and interception conditions as those used for obtaining the reference interference pattern, the conditions of step 1. Here, it is a question inter alia of positioning the object so that it is in the same configuration (distance, orientation, centering) with respect to the optical instruments of the assembly as during step 1. The obtained interference pattern is then compared (step 4) with the reference interference pattern by means of the image processing software package. A matching level between the interference pattern and the reference interference pattern is thereby determined from which the probability of an identity between the object to be recognized and the candidate object may be evaluated.

The identification area of the object to be recognized may have a very small surface area of the order of 0.01 mm$^2$. To properly observe the interference phenomenon, the identification area preferably should have peak-to-peak height surface changes larger than a quarter of the laser's wavelength. This is therefore referred to as Rt (peak-to-peak amplitude) roughness and not as Ra roughness. For example, the roughness may have a value of about 0.16 $\mu$m when working with a red laser at 0.633 $\mu$m.

It will be noted that the optical system, i.e., the configuration of the assembly of FIG. 3, as well as the laser's intensity are the most significant parameters when obtaining an interference pattern. This is why in step 3, the same illumination (laser intensity) and interception (same assembly configuration) conditions as those in step 1 are reproduced. If these conditions are observed and the current candidate object is the object to be recognized, an interference pattern substantially identical with the reference interference pattern will be obtained, obviously subject to the proviso that the observed surface portion is indeed the same as the one in step 1. It is therefore important to properly position the candidate object under the assembly of FIG. 3. For example, when rectangular objects with equal heights are used, an object support may be provided with positioning blocks, positioned at right angles. All the samples will then be secured against these blocks, which provides excellent reproducibility in positioning. Thus, if the current candidate object is the object to be recognized, the incident beam will automatically be on the identification area.

As indicated earlier, the present method may advantageously be applied for identifying nuclear fuel cells. A surface portion of this fuel is then used as an identification area. Within this context, the method has the advantage of being able to be implemented under water. For example, a base, comprising the laser and the camera at a certain distance from the fuel cells to be identified, may be set up and the latter may be approached by a probe connected to the base by means of optical fibers.

What is claimed is:

1. A method for identifying an object, said method comprising following steps:

a) selecting an intrinsic surface of said object to be identified that is capable of producing a random, non-standardized interference pattern when illuminated with a coherent light;

b) illuminating at least one identification area in said intrinsic surface with a coherent light and intercepting at least one portion of the light reflected by said identification area so as to obtain a random, non-standardized interference pattern under determined illumination and interception conditions;

c) retaining said random non-standardized interference pattern as a reference interference pattern of said object to be identified;

d) placing a candidate object likely to be said object to be identified under the same illumination and interception conditions as those used for obtaining said reference interference pattern and obtaining an interference pattern from said candidate object;

e) comparing said reference interference pattern with said interference pattern of said candidate object; and f) evaluating a probability of identity between said object to be identified and said candidate object depending-on the matching level between said reference interference pattern and said interference pattern of said candidate object.

2. The method according to claim 1, wherein said coherent light is a laser beam focused on said identification area.

3. The method according to claim 1, wherein said identification area has a surface area from 0.001 to 0.1 mm$^2$.

4. The method according to claim 3, wherein said identification area has a surface area of the order of magnitude of 0.01 mm$^2$.

5. The method according to claim 1, wherein:

said coherent light is a laser beam focused on said identification area; and said identification area has a peak-to-peak roughness that is larger than a quarter of the wavelength of the laser.

6. The method according to claim 1, wherein said identification area has a peak-to-peak roughness from 0.15 to 0.20 $\mu$m.

7. The method according to claim 1, wherein the reflected light is intercepted by means of a screen, a camera or a charge coupled device.

8. The method according to claim 1, wherein comparing said reference interference pattern with said interference pattern of said candidate object involves the use of a computer means.

9. The method according to claim 8, wherein said reference interference pattern is stored on a computer medium.

10. The method according to claim 8, wherein the matching level between said reference interference pattern and said interference pattern of said candidate object is determined by means of image processing software on said computer means.

11. The method according to claim 8, wherein an indication of the intensity of the reflected light as stored together with said reference interference pattern.

12. The method according to claim 1, wherein said intrinsic surface is a machined surface of said object to be identified.

* * * * *